United States Patent [19]
Yamamoto et al.

[11] 4,091,284
[45] May 23, 1978

[54] THERMOLUMINESCENT DOSIMETER READOUT INSTRUMENT

[75] Inventors: Terumasa Yamamoto; Katsuhiko Miyagawa; Hidenori Kunishige; Fusafumi Nakao, all of Kadoma, Japan

[73] Assignee: Matsushita Electric Industrial Co., Ltd., Japan

[21] Appl. No.: 725,711

[22] Filed: Sep. 23, 1976

[30] Foreign Application Priority Data
Oct. 1, 1975    Japan .................................. 50-119211

[51] Int. Cl.² .............................................. G01T 1/11
[52] U.S. Cl. ...................................... 250/337; 250/484
[58] Field of Search ................................ 250/484, 337

[56] References Cited

U.S. PATENT DOCUMENTS

| | | | |
|---|---|---|---|
| 3,229,097 | 1/1966 | Durkee et al. | 250/484 |
| 3,614,429 | 10/1971 | Perry | 250/337 |
| 3,792,277 | 2/1974 | Yamashita | 250/337 |

Primary Examiner—Harold A. Dixon
Attorney, Agent, or Firm—Robert E. Burns; Emmanuel J. Lobato; Bruce L. Adams

[57] ABSTRACT

A readout instrument comprising a heating device such as a multi-nozzle hot air blower for individually heating a plurality of thermoluminescence dosimeter elements, a photoelectric transducer, an optical guide for efficiently condensing the luminescence ray on the photosensitive face of the transducer, and a thermal radiation shield plate with slits in the same number as the dosimeter elements to minimize errors in the readout attributable to heat radiation from heated bodies such as components of the heating device.

8 Claims, 3 Drawing Figures

THERMOLUMINESCENT DOSIMETER READOUT INSTRUMENT

BACKGROUND OF THE INVENTION

This invention relates to a readout instrument for thermoluminescent dosimeters useful in the measurement of the dose of radiation such as gamma-ray.

A radiation dosimeter element of the thermoluninescence type emits thermoluminescence when the dosimeter element is heated to 200°–400° C after the exposure of the dosimeter element to radiation or radioactive ray. As is known, the intensity of the emitted thermoluminescence is proportional to the exposure dose in the preceding irradiation. Various heating methods have been employed in conventional readout instruments for thermoluminescent dosimeter elements. These heating methods are divided roughly into two types. In one type of the methods, the dosimeter element is contacted with a heat source. However, this method is rather inconvenient in practical applications, and some dosimeter elements are shaped unsuitable to this heating method. In the other type of the methods, hot air is blown against the dosimeter element. When a multi-element dosimeter is subjected to readout by the employment of a heating method of the latter type, the dosimeter is intermittently moved relatively to a nozzle for the blast of hot air so that the individual elements of the dosimeter may be heated in sequence. However, the transfer of the dosimeter elements during readout results in the consumption of a large amount of time for the overall readout operation and tends to cause appreciable errors in the readout due to a variation in the positional relationship between the nozzle and the individual dosimeter elements.

From a different point of view, there is a problem of optical noises at the readout of thermoluminescent dosimeter elements. In general, the intensity of thermoluminescence emitted from a conventional thermoluminescent dosimeter element is very feeble. It is difficult, therefore, to accomplish the readout with accuracy unless a readout instrument is designed to well suppress optical noises from various sources. Principal noise sources in the readout instrument are: (a) a dark current in the photoelectric transducer included in the instrument, (b) a leak of an external light into the instrument and (c) heat radiation from the heating section of the instrument, for example, from the walls of the heating chamber and/or certain components of the heating device such as the air nozzle and a heat exchanger. An optical noise caused by the source (a) depends primarily on the temperature of the photoelectric transducer. It is possible to suppress this noise to a satisfactorily low level by cooling the photoelectric transducer or, more conveniently, electrically compensating for this noise. A noise attributable to the source (b) can rather easily be precluded by making the readout instrument have either a fully closed construction with effective packings or a refracted construction relatively to the path of the emitted thermoluminescence.

The heat radiation (c) as the noise source is the most hard-to-solve problem in the conventional readout instruments regardless of the type of the heating method. The heating chamber and the heating device of the readout instrument always include some metal members or the like. A heated metal member, for example, emits from its surface a light of a wide wavelength range from the near infrared region to the infrared region, depending on the surface temperature of the metal member. When such a heat radiation occurs in the readout instrument, the intensity of the heat radiation governs the background level to the thermoluminescence. Since the intensity of the described heat radiation is variable with a change in the temperature, the occurrence of the heat radiation inevitably results in an irregular fluctuation of the background level and obstructs the measurement of the feeble thermoluminescence.

SUMMARY OF THE INVENTION

It is an object of the present invention to provide an improved readout instrument for one or a plurality of thermoluminescent dosimeter elements, which instrument is so constructed as to minimize the influence of heat radiation from a heating section of the instrument on the optical section of the instrument and efficiently condense the thermoluminescence on a photoelectric transducer thereby to allow the measurement of a feeble thermoluminescence emitted from each dosimeter element at a good signal-to-noise ratio.

According to the invention, a readout instrument for thermoluminescent dosimeters comprises: a support means for stationarily keeping one or a plurality of the dosimeter elements in preset positions; a heating means for selectively and individually heating the dosimeter elements to a predetermined temperature; a photoelectric transducer arranged to receive thermoluminescence emitted from each of the dosimeter elements; a thermal radiation shield plate which is interposed between the dosimeter elements and the photoelectric transducer to confront all of the dosimeter elements and has at least one slit shaped and arranged to individually confront each of the dosimeter elements, so that the thermoluminescence emitted from each dosimeter element is transmitted to the photoelectric transducer only through the confronting slit; and an optical guide member which is interposed between the thermal radiation shield plate and the photoelectric transducer and is shaped to condense the thermoluminescence transmitted through each of the slits onto the photoelectric transducer.

The heating means preferably comprise a hot air blast circuit with a plurality of nozzles arranged to individually confront each of the dosimeter elements and a control mechanism for selectively and individually operate the nozzles.

The optical guide member is preferably has the shape of a trapezoid prism with the longer side of the two parallel sides of the trapezoid arranged opposite the shield plate while the shorter side opposite the photoelectric transducer. Moreover, the entrance surface and/or the emergence surface of this guide member are preferably coated each with a filter layer which cuts off wavelengths in the infrared range or longer.

BRIEF DESCRIPTION OF THE DRAWINGS

The invention will fully be understood from the following detailed description of a preferred embodiment with reference to the accompanying drawings, wherein.

DESCRIPTION OF THE PREFERRED EMBODIMENTS

Figures 1, 2, 3:
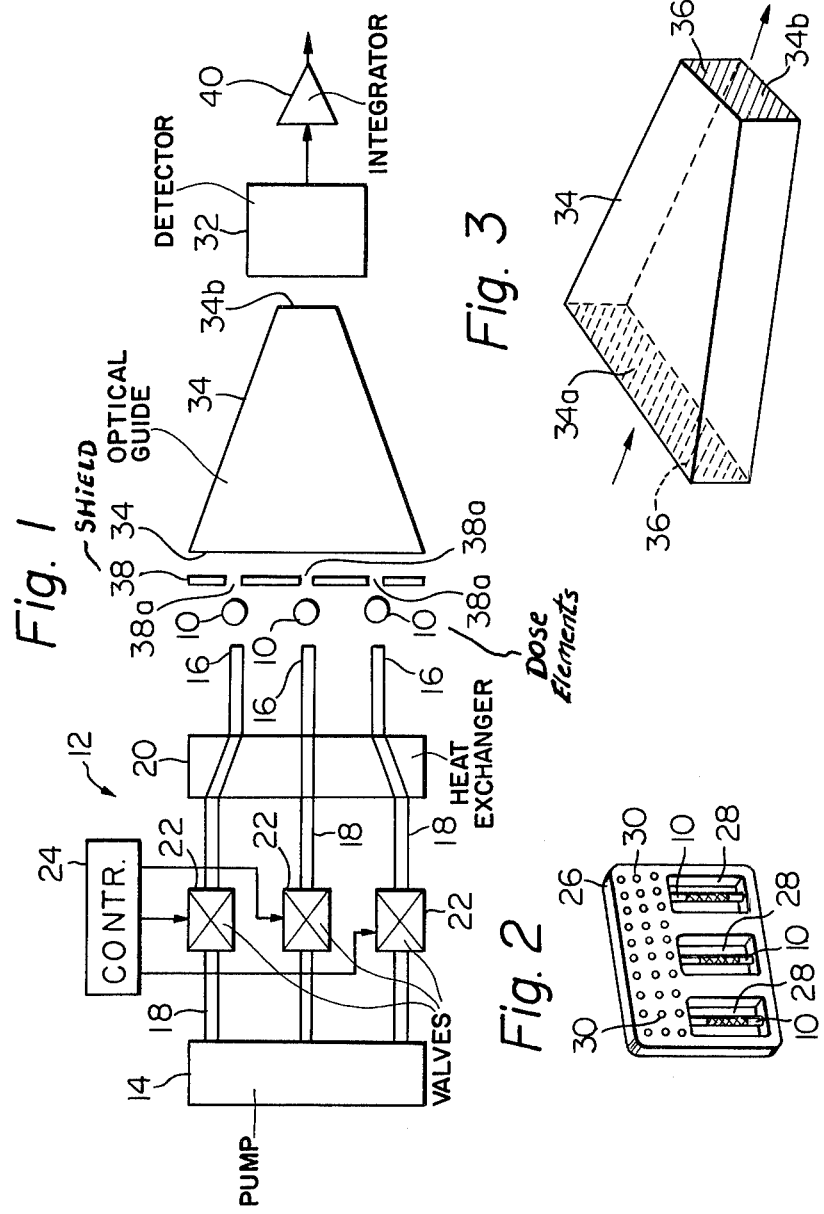
FIG. 1 is a diagrammatic presentation of the fundamental construction of a readout instrument according to the invention.
FIG. 2 is a perspective view of a multi-element thermoluminescent dosimeter which is subject to readout with the instrument of FIG. 1.
FIG. 3 is a perspective view of an optical guide member as a component of the instrument of FIG. 1.

The readout instrument of FIG. 1 as a preferred embodiment of the invention is designed for the readout of a plurality of thermoluminescent dosimeter elements 10, three elements 10 in the illustrated case, placed in a heating chember (not illustrated). These dosimeter elements 10 can stationarily be held in present positions at predetermined intervals between each other by means of a support (omitted from the illustration). The readout instrument has a heating device 12 which includes a pump 14 for conveying air to three nozzles 16 at a predetermined flow rate through ducts 18 and a heat exchanger 20 for heating the air current in the ducts 18 to a predetermined temperature, for example, ranging from about 200° to about 400° C by transferring heat from an externally heated medium. The three nozzles 16 are arranged to respectively blow the heated air against the three dosimeter elements 10 held in position. Three sets of flow control valves 22, for example, of the electromagnetic type are arranged between the pump 14 and the heat exchanger 20 to individually govern the fluid communication through the three ducts 18. A control circuit 24 selectively opens and closes the three electromagnetic valves 22 such that each of these valves 22 can be opened for a variable period of time while the remaining two valves 22 are kept closed.

The three thermoluminescent dosimeter elements 10 may either be three sets of single-element dosimeters or a single set of a three-element dosimeter. FIG. 2 shows an exemplary multi-element dosimeter. A frame member 26 having three apertures 28 holds the three thermoluminescent dosimeter elements 10 with intervals therebetween such that the dosimeter elements 10 are respectively received in the apertures 28 and left uncovered. Each of the dosimeter elements 10 takes the form of a glass ampoule containing therein a thermoluminescence material such as, for example, calcium sulfate activated with thulium ($CaSO_4$: Tm) or beryllium oxide (BeO). The frame member 26 has a multiplicity of tiny holes 30, which are systematically arranged such that the individual identification numbers of the dosimeter elements 10 can optically be observed during readout by selectively closing a portion of these holes 30.

The readout instrument of FIG. 1 has a conventional photoelectric transducer 32 at a certain distance from the dosimeter elements 10 on the reverse side to the nozzles 16. An optical guide member 34, which is made of an optical glass material such as quartz glass and has the shape of a quadrangular prism with a trapezoid cross-section (as seen in FIG. 3), is interposed between the dosimeter elements 10 and the photoelectric transducer 32. A longer one of the two parallel sides of the trapezoid is in the plane of incidence 34a of the optical guide 34 opposite the dosimeter elements 10, while the shorter one is in the plane of emergence 34b opposite the photoelectric transducer 32. The entrance surface 34a (serving as the plane of incidence) and/or the emergence surface 34b of the optical guide 34 are preferably coated each with an optical filter layer (indicated at 36) which can cut off wavelengths in the infrared range or longer. For example, the filter layer 36 is a laminated layer consisting of several thin ZnS layers and several thin $MgF_2$ layers respectively formed by evaporation deposition. The two kinds of thin layers are usually seven to nine in the total number, and the optical thickness ratio of the ZnS layers to the $MgF_2$ layers is made to be 2 : 1. The area of the entrance surface 34a of the optical guide 34 should be large enough to confront all of the dosimeter elements 10, and the emergence surface 34b has a smaller area than the entrance surface 34a.

A thin thermal radiation shield plate 38 is interposed between the dosimeter elements 10 and the entrance surface 34a of the optical guide 34. This plate 38 has three slits 38a which are appropriately shaped and arranged such that the luminescence rays from the three dosimeter elements 10 can partly enter the optical guide 34 through the respective slits 38a. The shield plate 38 is preferably made of a material having a large heat capacity such as a stainless steel and is preferably positioned as close as possible to the dosimeter elements 10. Each of the slits 38a is preferably smaller than each dosimeter element 10 both in height and in width.

An integrating circuit 40 is connected to the photoelectric transducer 32 to integrate the output of the transducer 32 over a predetermined amount of time.

When the electromagnetic valves 22 make one of the nozzles 16 blow hot air against one of the dosimeter elements 10 assigned to that nozzle 16, that dosimeter element 10 is heated to an intended temperature and emits luminescence. The emitted luminescence transmits through the surrounding medium (atmospheric air) in all directions, and a portion is condensed onto the photosensitive face of the photoelectric transducer 32 by means of the optical guide 34.

As described hereinbefore, the intensity of the thermoluminescence emitted from each dosimeter element 10 is very feeble in general though differs somewhat depending on the material of the dosimeter elements 10. The shield plate 38 positioned between the dosimeter elements 10 and the entrance surface 34a of the optical guide 34 is employed in the readout instrument according to the invention in order to minimize the unfavorable influence of an optical noise attributable to heat radiation from the walls of the heating chamber and/or certain components of the heating device such as the heat exchanger 20 and the nozzles 16 on the accuracy of the readout. Accordingly, the dimensions of the shield plate 38 and the slits 38a should be so determined as to shield the heat radiation as far as possible and transmit an adequate portion of the emitted luminescence to the optical guide 34.

The optical guide 34 is coated with the filter layer 36 in order to further lower the heat radiation level at the photosensitive face of the photoelectric transducer 32.

The optical guide 34 which has the shape of a trapezoid prism can efficiently condense the feeble luminescence emitted by each dosimeter element 10 onto the photosensitive face of the transducer 32. The employment of the thus shaped optical guide 34 is very effective in minimizing errors in the readout attributable to the difference in the distances between the individual dosimeter elements 10 and the photoelectric transducer 32 and/or a fluctuation in the photosensitivity of the photoelectric transducer 32.

The heating device of the multi-nozzle hot air blower type is employed to avoid errors in the readout resulting from the displacement of either the heating device or the dosimeter elements 10.

In the thus constructed readout instrument according to the invention, the heat radiation level at the photosensitive face of the transducer 32 can be lowered to less than 1/10 of the levels observed for conventional readout instruments. Accordingly, it is possible to measure with high accuracy a very small amount of radiation does by the use of a readout instrument according to the invention for conventional dosimeter elements 10.

What is claimed is:

1. A readout instrument for radiation dosimeters of the thermoluminescence type, comprising:
   support means for stationarily keeping one or a plurality of the dosimeter elements in preset positions;
   heating means for selectively and individually heating said dosimeter elements to a predetermined temperature;
   a photoelectric transducer arranged to receive thermoluminescence emitted from each of said dosimeter elements;
   a thermal radiation shield plate interposed between said dosimeter elements and said photoelectric transducer to confront all of said dosimeter elements, said shield plate having at least one slit shaped and arranged to individually confront a corresponding one of said dosimeter elements, each said one slit being smaller than a corresponding dosimeter both in width and in height so that the thermoluminescence emitted from each of said dosimeter elements is transmitted to said photoelectric transducer only through the confronting slit; and
   an optical guide member interposed between said shield plate and said photoelectric transducer and shaped to condense the thermoluminescence transmitted through each of said at least one slit onto said photoelectric transducer.

2. A readout instrument as claimed in claim 1, wherein said heating means comprise a plurality of nozzles arranged to individually confront each of said dosimeter elements and a controllable hot air circuit arranged to selectively and individually supply hot air of a predetermined temperature to said nozzles at a predetermined flow rate.

3. A readout instrument as claimed in claim 1, wherein said optical guide member has an incidence surface the area of which is large enough to confront all of said dosimeter elements in position and an emergence surface of a smaller area than said incidence surface.

4. A readout instrument as claimed in claim 3, wherein said optical guide member is made of an optical glass and has the shape of a trapezoid prism, the longer one and the shorter one of the two parallel sides of the trapezoid being said incidence and emergence surfaces, respectively.

5. A readout instrument as claimed in claim 3, wherein at least one of said incidence and emergence surfaces of said optical guide member is coated with a filter layer which cuts off wavelengths in the infrared range or longer.

6. A readout instrument as claimed in claim 5, wherein said filter layer is a laminated layer consisting of at least one ZnS layer and at least one $MgF_2$ layer each formed by evaporation deposition.

7. A readout instrument for radiation dosimeters of the thermoluminescence type, comprising:
   support means for stationarily keeping one or a plurality of the dosimeter elements in preset positions;
   a heating mechanism having a plurality of nozzles arranged to individually confront each of said dosimeter elements, an air feed circuit arranged to convey air at a predetermined flow rate to each of said nozzles, a heat exchanger arranged to heat air passing through said air feed circuit to a predetermined temperature, a plurality of flow control valves arranged to respectively govern the conveyance of air through said air feed circuit to said nozzles and a valve control means for selectively open and close said flow control valves such that said flow control valves are opened one at a time in sequence;
   a photoelectric transducer arranged to receive thermoluminescence emitted from each of said dosimeter elements;
   a thermal radiation shield plate interposed between said dosimeter elements and said photoelectric transducer to confront all of said dosimeter elements, said shield plate having at least one slit which is smaller than each of said dosimeter elements both in width and in height and is arranged to individually confront each of said dosimeter elements; and
   an optical guide member of an optical glass which is interposed between said shield plate and said photoelectric transducer and has an incidence surface opposite said shield plate with an area large enough to confront all of said dosimeter elements and an emergence surface opposite said photoelectric transducer with an area smaller than the area of said incidence surface, said optical guide member having the shape of a trapezoid prism, the longer one and the shorter one of the two parallel sides of the trapezoid being in said incidence surface and said emergence surface, respectively, at least one of said incidence and emergence surfaces being coated with a filter layer which cuts off wavelengths in the infrared range or longer.

8. A readout instrument for radiation dosimeters of the thermoluminescence type, comprising:
   support means for stationarily keeping one or a plurality of the dosimeter elements in preset positions;
   a heating mechanism including a plurality of nozzles arranged to individually confront each of said dosimeter elements and a controllable hot air circuit arranged to selectively and individually supply hot air of a predetermined temperature to said nozzles at a predetermined flow rate;
   a photoelectric transducer arranged to receive thermoluminescence emitted from each of said dosimeter elements;
   an optical guide member interposed between said shield plate and said photoelectric transducer and shaped to condense the thermoluminescence transmitted through each of said at least one slit onto said photoelectric transducer; and
   a thermal radiation shield plate interposed between said dosimeter elements and said optical guide member to confront all of said dosimeter elements, said shield plate being shaped and dimensioned to shield said optical guide member from heat radiation from said heating mechanism, said shield plate having a confronting slit for each dosimeter which is not substantially larger than each corresponding dosimeter element both in width and in height and arranged to individually confront a corresponding dosimeter element, so that the thermoluminescence emitted from each of said dosimeter elements is transmitted to said optical guide member only through the confronting slit.

* * * * *